United States Patent
Song et al.

(10) Patent No.: US 12,131,735 B2
(45) Date of Patent: Oct. 29, 2024

(54) MAN-MACHINE DIALOGUE MODE SWITCHING METHOD

(71) Applicant: AI Speech Co., Ltd., Jiangsu (CN)

(72) Inventors: Hongbo Song, Jiangsu (CN); Weisi Shi, Jiangsu (CN); Chengya Zhu, Jiangsu (CN); Shuai Fan, Jiangsu (CN)

(73) Assignee: AI Speech Co., Ltd., Jiangsu (CN)

( * ) Notice: Subject to any disclaimer, the term of this patent is extended or adjusted under 35 U.S.C. 154(b) by 274 days.

(21) Appl. No.: 17/770,206

(22) PCT Filed: Nov. 25, 2019

(86) PCT No.: PCT/CN2019/120617
§ 371 (c)(1),
(2) Date: Apr. 19, 2022

(87) PCT Pub. No.: WO2021/082133
PCT Pub. Date: May 6, 2021

(65) Prior Publication Data
US 2022/0399020 A1    Dec. 15, 2022

(30) Foreign Application Priority Data

Oct. 28, 2019    (CN) .......................... 201911028778.2

(51) Int. Cl.
*G10L 15/22*    (2006.01)
*G10L 17/22*    (2013.01)

(52) U.S. Cl.
CPC .............. *G10L 15/22* (2013.01); *G10L 17/22* (2013.01); *G10L 2015/223* (2013.01)

(58) Field of Classification Search
CPC . G10L 15/04; G10L 15/22; G10L 5/14; G10L 5/16
See application file for complete search history.

(56) References Cited

U.S. PATENT DOCUMENTS

| | | | |
|---|---|---|---|
| 7,912,070 B1* | 3/2011 | Choksi | H04L 65/1089 455/552.1 |
| 9,397,820 B2* | 7/2016 | Schulz | H04K 3/822 |

(Continued)

FOREIGN PATENT DOCUMENTS

| | | |
|---|---|---|
| CN | 105679314 A | 6/2016 |
| CN | 105812573 A | 7/2016 |

(Continued)

OTHER PUBLICATIONS

Wikipedia, "Duplex (telecommunications)", Dec. 10, 2022.

(Continued)

*Primary Examiner* — Feng-Tzer Tzeng
(74) *Attorney, Agent, or Firm* — Sisson & Banyas, Attorneys at Law, LLC

(57) ABSTRACT

The present disclosure discloses a man-machine dialogue mode switching method, which is applicable to an electronic device. The method includes receiving a current user sentence spoken by a current user; determining whether a dialogue field to which the current user sentence belongs is a preset dialogue field; if yes, switching the current dialogue mode to a full-duplex dialogue mode; and if not, switching the current dialogue mode to a half-duplex dialogue mode. In the present disclosure, the dialogue mode is switched by determining whether the dialogue field to which the current user sentence belongs is the preset dialogue field, and the dialogue mode can be automatically switched and adjusted according to the difference of the dialogue fields, such that the man-machine dialogue is always in the most suitable dialogue mode and can be realized smoothly.

10 Claims, 4 Drawing Sheets

(56) References Cited

U.S. PATENT DOCUMENTS

| | | | | |
|---|---|---|---|---|
| 9,516,545 | B2* | 12/2016 | Cheng | H04L 5/16 |
| 11,184,144 | B2* | 11/2021 | Choi | H04L 5/14 |
| 11,569,972 | B2* | 1/2023 | Kazmi | H04L 1/1825 |
| 2009/0316881 | A1* | 12/2009 | Prakash | H04M 9/082 |
| | | | | 379/406.01 |
| 2012/0207038 | A1* | 8/2012 | Choi | H04W 16/14 |
| | | | | 455/67.11 |
| 2018/0182398 | A1* | 6/2018 | Halstvedt | G06F 16/3329 |
| 2018/0364798 | A1 | 12/2018 | Kingsbury | |
| 2022/0038398 | A1* | 2/2022 | Zhou | H04M 3/4936 |

FOREIGN PATENT DOCUMENTS

| | | |
|---|---|---|
| CN | 105931638 A | 9/2016 |
| CN | 108108340 A | 6/2018 |
| CN | 109657091 A | 4/2019 |
| CN | 110300435 A | 10/2019 |
| JP | 2018185362 A | 11/2018 |
| JP | 2019527371 A | 9/2019 |
| JP | 2019175344 A | 10/2019 |

OTHER PUBLICATIONS

European Patent Office, EP19950263.4—EPO Communication pursuant to Article 94(3) EPC, Oct. 4, 2024.
European Patent Office, EP19950263.4—Supplementary European search report, Jul. 11, 2022.
Japanese Patent Office, JP2020-524252—Notice of Reasons for Refusal, Jun. 23, 2023.
Japanese Patent Office, JP2020-524252—Notice of Reasons for Refusal (translated), Jun. 23, 2023.
International Business Machines (IBM) Technical Disclosure Bulletin, "Method for switching a speech recognizer from asynchronous to synchronous recognition", vol. 36 No. 3 Mar. 1993.

* cited by examiner

MAN-MACHINE DIALOGUE MODE SWITCHING METHOD

PRIORITIES AND CROSS REFERENCES

This application claims priority from International Application No. PCT/CN2019/120617 filed on 25 Nov. 2019, and Chinese Application No. 201911028778.2 filed on 28 Oct. 2019, the teachings of each of which are incorporated by reference herein in their entirety.

TECHNICAL FIELD

The present disclosure relates to the technical field of man-machine dialogue, and in particular, to a man-machine dialogue mode switching method.

BACKGROUND

In the current man-machine dialogue (e.g., a dialogue between a user and a smart speaker), a full-duplex dialogue mode or a half-duplex dialogue mode is mostly used.

The full-duplex dialogue mode features in that recording is always kept on during the interaction process, and TTS broadcast and recording can be carried out simultaneously, with a bidirectional simultaneous transmission upstream and downstream. This mode has an advantage of natural interaction mode without audio missing, while it also has a disadvantage in that since the recording is kept on for a long time, TTS broadcast sound will be recorded if the current AEC (acoustic echo cancellation) technology is not mature enough, which will cause misrecognition and thus trigger change of dialogue state by mistake, affecting the dialogue process.

The half-duplex dialogue mode features in that no recording is performed during voice broadcast, and upstream and downstream data are alternately transmitted. This mode has an advantage in that since no recording is performed during TTS broadcasts, false triggering of the dialogue process caused by noise can be avoided, while it also has a disadvantage in that since no recording is performed during voice broadcasts, users have to wait for the completion of the broadcast before proceeding to the next round of dialogue, which causes the interaction process unnatural.

SUMMARY

Embodiments of the present disclosure provide a man-machine dialogue mode switching method and system, which are intended to solve at least one of the above technical problems.

In a first aspect, an embodiment of the present disclosure provides a man-machine dialogue mode switching method, including:

receiving a current user sentence spoken by a current user;

determining whether a dialogue field to which the current user sentence belongs is a preset dialogue field, and if yes, switching a current dialogue mode to a full-duplex dialogue mode, or if not, switching the current dialogue mode to a half-duplex dialogue mode.

In a second aspect, an embodiment of the present disclosure provides a man-machine dialogue mode switching system, including:

a voice receiving module configured to receive a current user sentence spoken by a current user;

a dialogue field determining module configured to determine whether a dialogue field to which the current user sentence belongs is a preset dialogue field; and a dialogue mode switching module configured to switch the current dialogue mode to a full-duplex dialogue mode when it is determined that the dialogue field to which the current user sentence belongs is the preset dialogue field; and switch the current dialogue mode to the half-duplex dialogue mode when it is determined that the dialogue field to which the current user sentence belongs is not the preset dialogue field.

In a third aspect, an embodiment of the present disclosure provides a storage medium, in which one or more programs containing executable instructions are stored, wherein the executable instructions may be read and executed by an electronic device (including but not limited to a computer, a server, or a network device, etc.), so as to implement any one of the above man-machine dialogue mode switching method.

In a fourth aspect, an electronic device is provided, including: at least one processor, and a memory communicatively coupled to the at least one processor, wherein the memory stores instructions executable by the at least one processor, and the instructions, when being executed by the at least one processor, cause the at least one processor to implement any one of the above man-machine dialogue mode switching method.

In a fifth aspect, an embodiment of the present disclosure further provides a computer program product, including a computer program stored on a storage medium, wherein the computer program contains program instructions, and the program instructions, when being executed by a computer, cause the computer to implement any one of the above man-machine dialogue mode switching method.

The beneficial effects of the embodiments of the present disclosure lie in that the dialogue mode is switched by determining whether the dialogue field to which the current user sentence belongs is the preset dialogue field, and the dialogue mode may be automatically switched and adjusted according to the difference of the dialogue fields, such that the man-machine dialogue is always in the most suitable dialogue mode and can be carried out smoothly.

BRIEF DESCRIPTION OF THE DRAWINGS

In order to more clearly explain the technical solutions of the embodiments of the present invention, drawings necessary in the description of the embodiments will be described below. Obviously, the drawings in the following description are some embodiments of the present invention. Those skilled in the art can obtain other drawings based on these drawings without inventive effort.

DETAILED DESCRIPTION

Figure 1:
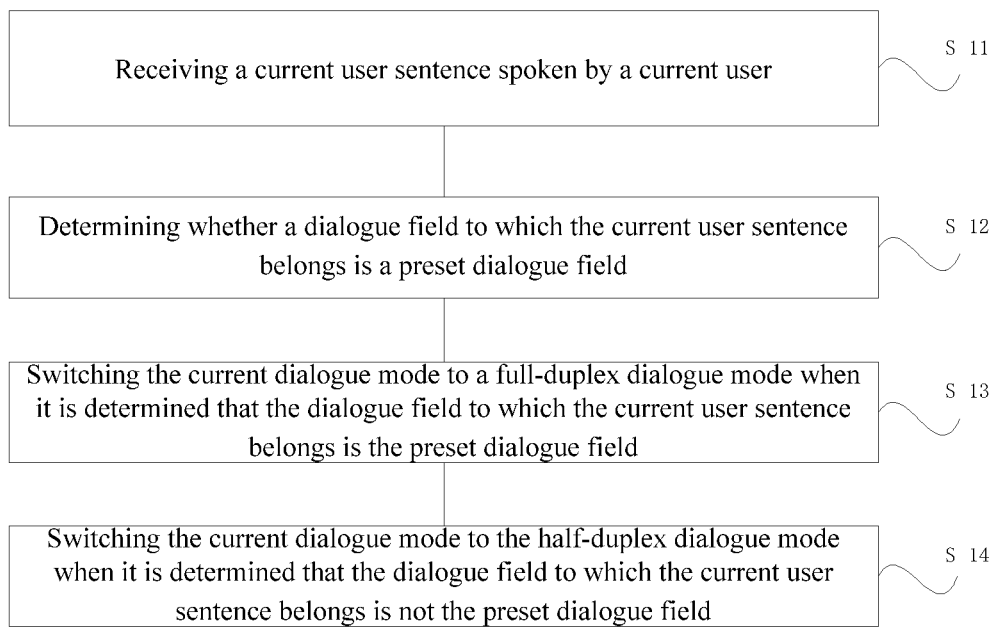
FIG. 1 is a flowchart of a man-machine dialogue mode switching method according to an embodiment of the present disclosure.

In order to make the objectives, technical solutions and advantages of the embodiments of the present disclosure clearer, the technical solutions in the embodiments of the present disclosure will be described clearly and completely below with reference to the accompanying drawings in the embodiments of the present disclosure. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other when no conflict exists.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

FIG. 1 shows a man-machine dialogue mode switching method according to an embodiment of the present disclosure. The method may be applied to an electronic device equipped with a man-machine dialogue system. The electronic device may be a smart speaker, a smart phone, an intelligent robot, etc., which is not limited in the present disclosure.

Hereinafter, the man-machine dialogue mode switching method according to the present disclosure is described by taking a smart speaker as an example. The method may include the following steps.

In S11, a current user sentence spoken by a current user is received.

For example, upon being woken up by the current user, the smart speaker activates a default dialogue mode or a dialogue mode suitable for the current user, and detects the user's voice signal. When the current user sentence spoken by the current user is detected, the sentence is recognized.

In S12, whether a dialogue field to which the current user sentence belongs is a preset dialogue field is determined.

For example, the smart speaker acquires a text content corresponding to the current user sentence, determines a dialogue field to which the current user sentence belongs based on the text content, and further determines whether the dialogue field is a preset dialogue field. For example, different dialogue fields correspond to different dialogue scenarios, or dialogue fields correspond to skills set in the smart speaker. Each skill belongs to a dialogue field. For example, an idiom solitaire skill, a navigation skill, a weather query skill, and a ticket booking skill belong to different dialogue fields.

In S13, when it is determined that the dialogue field to which the current user sentence belongs corresponds to the preset dialogue field, the current dialogue mode is switched to a full-duplex dialogue mode.

For example, if the current dialogue mode of the smart speaker is the full-duplex dialogue mode, the current dialogue mode may be maintained; and if the current dialogue mode of the smart speaker is a half-duplex dialogue mode, it is switched to the full-duplex dialogue mode.

In S14, when it is determined that the dialogue field to which the current user sentence belongs does not correspond to the preset dialogue field, the current dialogue mode is switched to the half-duplex dialogue mode.

For example, if the current dialogue mode of the smart speaker is the half-duplex dialogue mode, the current dialogue mode may be maintained; and if the current dialogue mode of the smart speaker is the full-duplex dialogue mode, it is switched to the half-duplex dialogue mode.

In this embodiment, the dialogue mode is switched by determining whether the dialogue field to which the current user sentence belongs corresponds to the preset dialogue field, and the dialogue mode may be automatically switched and adjusted according to the different dialogue fields, such that the man-machine dialogue is always in the most suitable dialogue mode and a smooth man-machine dialogue can be realized.

In some embodiments, when it is determined that the dialogue field to which the current user sentence belongs is the half-duplex dialogue field, the current dialogue mode is switched to the half-duplex dialogue mode, otherwise the current dialogue mode is maintained (the current dialogue mode may be the half-duplex dialogue mode, or the full-duplex dialogue mode). For example, the half-duplex dialogue field is a preconfigured specified dialogue field.

Figure 2:
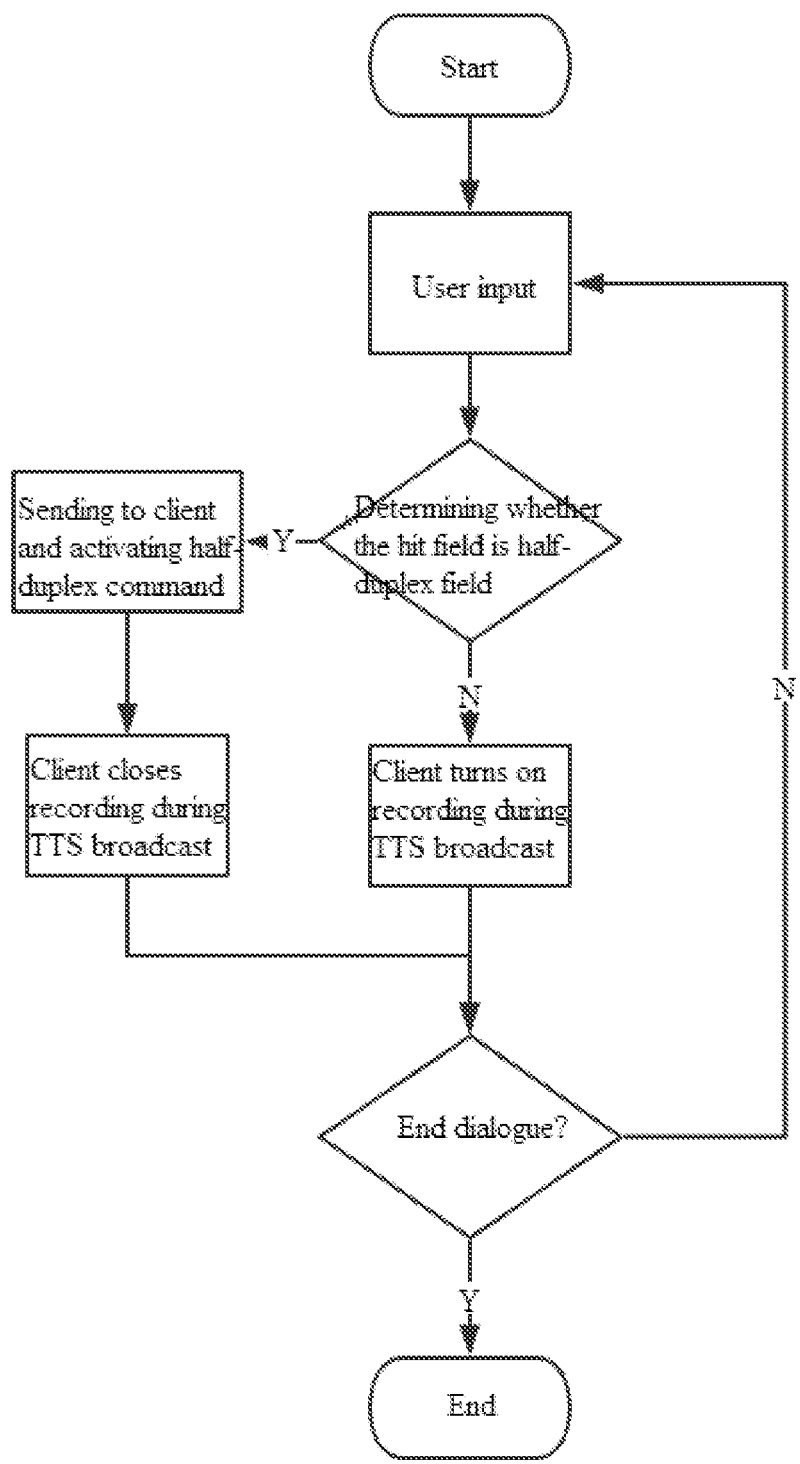
FIG. 2 is a flowchart of a man-machine dialogue mode switching method according to another embodiment of the present disclosure.

FIG. 2 shows a flowchart of a man-machine dialogue mode switching method according to another embodiment of the present disclosure. The method includes the following steps:

User makes an input;

whether the dialogue field to which the user input corresponds currently is a half-duplex field;

if yes, the user input is sent to a client to enable a half-duplex command, that is, activating a half-duplex dialogue mode, such that recording is closed in the client during TTS broadcast; or if not, the client starts recording during TTS broadcast, namely activating a full-duplex dialogue mode; and then whether the dialogue is over is determined, and if not, the above steps are continuously repeated.

For example, the client broadcasts a more important TTS message, hoping that the user can listen to the message completely without being interrupted abnormally. Certain dialogue fields may be specified to be in a half-duplex mode through cloud configuration. When the user sentence corresponds to the field, the cloud sends a message to the client. In this case, the client automatically switches to the half-duplex mode. During TTS broadcast, the recording is stopped, so as to avoid introducing noise and affecting the dialogue status.

For example, if the user uses an audio device without a screen, the user does not know what commands to say next before listening to the whole TTS broadcast which in this case is very important information. If the user does not finish listening due to the interruption of TTS, the user will not know what to say next. The following example is a dialogue between a user U and a machine M.

U: I want to recite an ancient poem

M: "In the silence of night" by Li Bai of Tang Dynasty. If you forget it, you can say ' remind me', and when you finish the task, you can say 'Exit'

U: Remind me.

In some embodiments, when in the full-duplex dialogue mode, the method further includes following steps.

During a multi-round dialogue process, determining a dialogue field to which a received new user sentence belongs.

If the new user sentence belongs to a different dialogue field from a previous user sentence in the process of multi-round dialogue, keep a reply content corresponding to the previous user sentence.

In this embodiment as an example, the jumping of the dialogue field may be restricted adaptively based on the dialogue context. Restricting the switching-over of the dialogue field can avoid interaction interference caused by the switching of the dialogue fields. In a task-based multi-round dialogue scenario, the switching of the dialogue fields will cause the previous dialogue context to be cleared.

For example, the dialogue between the user U and the machine M is as follows:

U: I want to go to the train station by navigation.

M: I found the following places, which one is it?

U: The first one.

M: A route is planned for you. For a shortest distance, avoiding traffic jams, and not taking the highway, which one do you choose?

U: The second one.

M: The route has been planned successfully. Do you want to start navigation?

U: Make a phone call

M: Who do you want to call?

The detected "make a phone call" may be a misrecognition caused by surrounding noise. In this case, if the system responds to the input, it will switch the dialogue field, causing the task of navigation to be interrupted and entering the phone field, resulting in that the previously input context information is cleared. If the user wants to return to the navigation field, the navigation information needs to be input again, which will deteriorate the interactive experience.

The man-machine dialogue mode switching method in this embodiment can decide whether to respond to the new user sentence based on whether the dialogue field of the new user sentence is the same as that of the current multi-round dialogue, so as to avoid misrecognition caused by surrounding noise, such that the current multi-round dialogue task is successfully completed.

Figure 3:
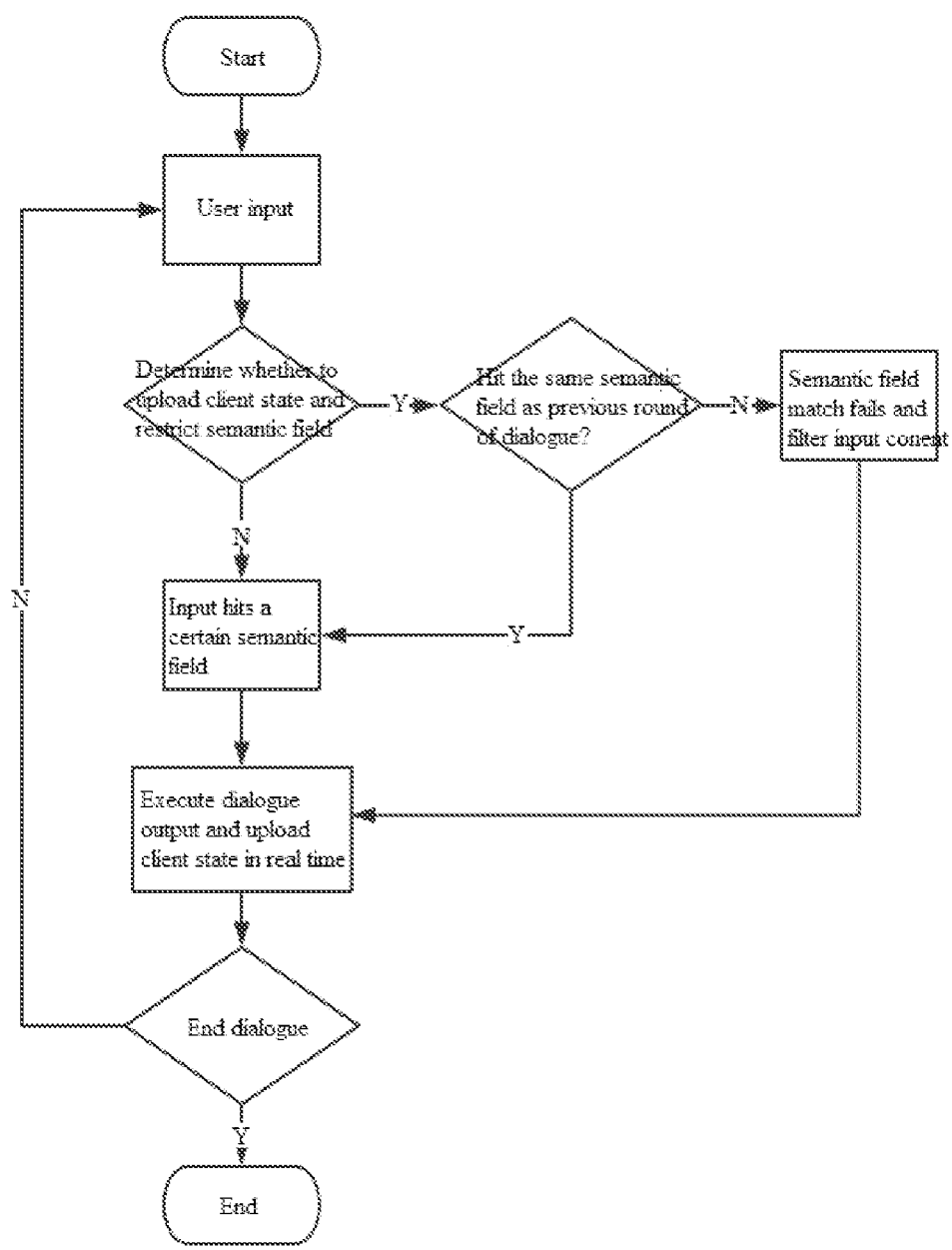
FIG. 3 is a flowchart of a man-machine dialogue mode switching method according to still another embodiment of the present disclosure.

FIG. 3 shows a flowchart of a man-machine dialogue mode switching method according to another embodiment of the present disclosure. The method includes the following steps.

A user makes an input.

Whether the client status is uploaded is determined to restrict the semantic field. For example, if the current client is in a TTS broadcast status, the semantic field is restricted; and if the current client is in a non-TTS broadcast status, there is no need to restrict the semantic field.

If the client status is not uploaded, the input hits a certain semantic field (i.e., the dialogue field of the current multi-round dialogue); or If the client status is uploaded, whether the user input corresponds to the same semantic field as the previous round of dialogue is determined, then if yes, the input hits a certain semantic field (i.e., the dialogue field of the current multi-round dialogue); or if not, the semantic match fails, and the user input is filtered out.

Dialogue output is then conducted and the client status is uploaded in real time.

The dialogue is ended.

The man-machine dialogue mode switching method according to the present disclosure actually realizes an adaptive dialogue mode switching method, which can restrict field jumping based on the client status (e.g., in a TTS broadcast process), and release the field jumping restriction after the client status changes (the TTS broadcast is completed). In this way, the misidentification caused by noise during the TTS broadcast process is reduced.

The client uploads the state to the server in real time, and the server adaptively switches the dialogue state based on the client status in combination with the dialogue context, which can effectively reject recognizing noise input. In the present disclosure, the dialogue mode is adaptively changed based on the dialogue scenario and the client status, and activates corresponding dialogue modes in different scenarios, so as to meet the needs of various scenarios.

In some embodiments, the man-machine dialogue mode switching method according to the present disclosure further includes:

saving the reply content corresponding to the previous user sentence if the new user sentence is received again;

acquiring a reply content corresponding to the new user sentence and presenting the same to the user; and when a user voice instruction to re-acquire the reply content of the previous user sentence is received, acquiring the stored reply content of the previous user sentence and presenting the same to the user.

In this embodiment, although the new user sentence belongs to a different dialogue field from the previous user sentence in the process of multi-round dialogue, the current user may indeed want to urgently end the current multi-round dialogue and start a dialogue in another field. In this case, although the new user sentence input by the current user for the first time is filtered out by the system and not responded, the user usually tries to input a new user sentence for the second time. In this embodiment, this practical scenario may be taken into account, thereby ensuring that the real needs of the current user are satisfied, and the user experience is improved.

In addition, since the reply content corresponding to the previous user sentence is saved, when the user wants to retrieve the previous reply content, the result may be directly presented to the user without requiring the user to repeat the multi-round dialogue that have been conducted before to acquire the reply content.

In some embodiments, the user voice instruction includes returning to a previous task or a previous user sentence or an answer sentence to the last question in the previous round of dialogue.

For example, taking the dialogue between an user U and a machine M about going to the train station as an example, when the user finishes the call, he says "return to the previous task", or "the second one", or "start navigation" to the machine, then the machine can re-present the navigation route acquired by the previous multi-round dialogue to the user.

In some embodiments, the preset dialogue field is a dialogue field of which the number of use by the current user exceeds a set threshold. In this embodiment, the man-machine dialogue mode switching method further includes:
  determining whether the number of mentioning the dialogue field to which the current user sentence belongs by the current user exceeds a set threshold; and
  if yes, marking the dialogue field to which the current user voice belongs as the preset dialogue field corresponding to the current user.

For example, the client (i.e., the smart speaker) reports the user's daily operations to the server through events. When a user enters a certain field, it is found according to user behavior statistics that the user often uses a certain process, and then the process automatically activates the full-duplex mode during TTS broadcast. During the TTS broadcast process, the user can speak in advance and enters the next round of dialogue flow without waiting for the completion of the TTS broadcast.

For example, the dialogue between user U and machine M is:
  U: Hello Xiaochi (wake-up word).
  M: Hello master, what are you going to do? You can say "make a phone call", "play music", "navigate", or "set up".
  U: Navigation to the train station (the user can say "navigation to the train station" when the machine just starts broadcasting "Hello Master", instead of waiting for the entire TTS broadcast to complete).

In some embodiments, said determining whether the dialogue field to which the current user sentence belongs is the preset dialogue field includes:
  determining the dialogue field to which the current user sentence belongs; and
  acquiring user characteristic information of the current user based on the current user sentence, as an example, the user characteristic information is the user's voiceprint information;
  querying the preset dialogue field corresponding to the current user based on the user characteristic information, in which the queried preset dialogue field includes at least one specific dialogue field; and
  determining whether the dialogue field belongs to the preset dialogue field.

In the process of implementing the present disclosure, the inventors found that the same electronic device (e.g., a smart speaker) may be used by a plurality of different users (e.g., a smart speaker used at home will be used by a plurality of family members). In this case, different users have different usage habits or amount levels of using the smart speaker, or have different knowledge of different dialogue fields. It is necessary for the smart speaker to adjust different dialogue modes to better realize man-machine dialogue.

In the method according to this embodiment, different users have different preset dialogue fields, different users are identified through the users' voiceprint information, and the corresponding preset dialogue fields are determined, such that whether the dialogue field of the current sentence of the current user is a preset dialogue field may be accurately determined, and finally an appropriate dialogue mode is chosen for man-machine dialogue.

In some embodiments, before receiving the current user sentence spoken by the current user, the method further includes: detecting a wake-up word;
  determining the user characteristic information of the current user based on the detected wake-up word voice;
  querying whether the user characteristic information of the current user exists in a user characteristic information database;
  if yes, activating the full-duplex dialogue mode; and
  if not, activating the half-duplex dialogue mode, and storing the user characteristic information in the user characteristic information database.

This embodiment realizes the adaptive selection of the initial dialogue mode after the system is woken up. In the process of implementing the present disclosure, the inventors found that the smart speaker or the story machine will always broadcast the preset introduction content or the content that guides the user on how to use it when turned on, which is indeed very practical for new users while seems redundant or even disgusting for users who have already been familiar with the smart speaker or story machine.

In the method according to this embodiment, when the smart speaker or the story machine is awakened, whether the current user is a new user is determined by comparing user characteristic information (e.g., voiceprint information) extracted from the current user's wake-up voice with the locally stored voiceprint information database. If not, the system is initialized to a full-duplex dialogue mode, such that the user can input voice commands at any time to control the smart speaker or story machine.

For example, the present disclosure also provides an electronic device, including: at least one processor, and a memory communicatively coupled to the at least one processor, wherein the memory stores instructions executable by the at least one processor, and the instructions, when being executed by the at least one processor, cause the at least one processor to:
  receive a current user sentence spoken by a current user;
  determine whether a dialogue field to which the current user sentence belongs is a preset dialogue field,
  if yes, switch a current dialogue mode to a full-duplex dialogue mode; and
  if not, switch the current dialogue mode to a half-duplex dialogue mode.

In some embodiments, the at least one processor is further configured to, when in full-duplex dialogue mode,
  determine a dialogue field to which a received new user sentence belongs in the process of multi-round dialogue; and keep a reply content corresponding to the previous user sentence if the new user sentence and a previous user sentence in the process of multi-round dialogue belong to different dialogue fields.

In some embodiments, the at least one processor is further configured to:
if the new user sentence is received again, save the reply content corresponding to the previous user sentence;
acquire a reply content corresponding to the new dialogue sentence and present the same to the user; and
acquire the stored reply content of the previous user sentence and presenting the same to the user upon receiving a user voice instruction to re-acquire the reply content of the previous user sentence.

In some embodiments, the preset dialogue field is a dialogue field of which the number of use by the current user exceeds a set threshold; and
the at least one processor is further configured to:
determine whether the number of mentioning the dialogue field to which the current user sentence belongs by the current user exceeds the set threshold; and
if yes, mark the dialogue field to which the current user voice belongs as the preset dialogue field corresponding to the current user.

In some embodiments, said the step of determining whether the dialogue field to which the current user sentence belongs is the preset dialogue field includes:
determining the dialogue field to which the current user sentence belongs;
acquiring user characteristic information of the current user based on the current user sentence;
querying the preset dialogue field corresponding to the current user based on the user characteristic information; and
determining whether the dialogue field belongs to the preset dialogue field.

In some embodiments, the at least one processor is further configured to, before receiving the current user sentence spoken by the current user,
detect a wake-up word;
determine user characteristic information of the current user based on the detected wake-up word;
query whether the user characteristic information of the current user exists in a user characteristic information database, and
if yes, activate full-duplex dialogue mode, or
if not, activate the half-duplex dialogue mode, and store the user characteristic information in the user characteristic information database.

It should be noted that the foregoing method embodiments are described as a series of actions for the sake of simple description, but those skilled in the art would appreciate that the present application is not limited by the sequence of actions described hereinabove, because according to the present invention, certain steps can be performed in other orders or simultaneously. Secondly, those skilled in the art would also appreciate that the embodiments described in the specification are all preferred embodiments, and the involved actions are not necessarily required by the present application. In the above embodiments, the description of each embodiment has its own emphasis. For a part that is not detailed in an embodiment, reference can be made to the related descriptions of other embodiments.

Figure 4:
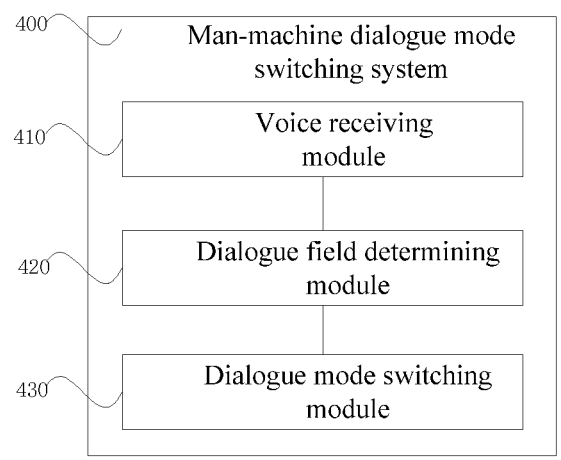
FIG. 4 is a schematic block diagram of a man-machine dialogue mode switching system according to an embodiment of the present disclosure.

As shown in FIG. 4, a man-machine dialogue mode switching system 400 is further provided according to an embodiment of the present disclosure, including:

a voice receiving module 410 configured to receive a current user sentence spoken by a current user;
a dialogue field determining module 420 configured to determine whether a dialogue field to which the current user sentence belongs is a preset dialogue field; and
a dialogue mode switching module 430 configured to switch the current dialogue mode to a full-duplex dialogue mode when it is determined that the dialogue field to which the current user sentence belongs is the preset dialogue field, and to switch the current dialogue mode to a half-duplex dialogue mode when it is determined that the dialogue field to which the current user sentence belongs is not a preset dialogue.

In some embodiments, the man-machine dialogue mode switching system is further configured to, when in the full-duplex dialogue mode,
determine a dialogue field to which a received new user sentence belongs in the process of multi-round dialogue; and
keep a reply content corresponding to the previous user sentence if the new user sentence and a previous user sentence in the process of multi-round dialogue belong to different dialogue fields.

In some embodiments, the man-machine dialogue mode switching system is further configured to:
if the new user sentence is received again, save the reply content corresponding to the previous user sentence;
acquire a reply content corresponding to the new dialogue sentence and presenting the same to the user; and
upon receiving a user voice instruction to re-acquire the reply content of the previous user sentence, acquire the stored reply content of the previous user sentence and present the same to the user.

In some embodiments, the preset dialogue field is a dialogue field of which the number of using by the current user exceeds a set threshold; and the man-machine dialogue mode switching system is further configured to:
determine whether the number of times the dialogue field to which the current user sentence belongs is mentioned by the current user exceeds the set threshold; and
if yes, mark the dialogue field to which the current user voice belongs as the preset dialogue field corresponding to the current user.

In some embodiments, the step of determining whether the dialogue field to which the current user sentence belongs is the preset dialogue field includes:
determining the dialogue field to which the current user sentence belongs;
acquiring user characteristic information of the current user based on the current user sentence;
querying the preset dialogue field corresponding to the current user based on the user characteristic information; and
determining whether the dialogue field belongs to the preset dialogue field.

In some embodiments, the man-machine dialogue mode switching system is further configured to, before receiving the current user sentence spoken by the current user:
detect a wake-up word;
determine user characteristic information of the current user based on the detected wake-up word;
query whether the user characteristic information of the current user exists in a user characteristic information database, and
if yes, activate full-duplex dialogue mode; or if not, activate the half-duplex dialogue mode, and store the user characteristic information in the user characteristic information database.

In some embodiments, the user characteristic information is the user's voiceprint information.

In some embodiments, a non-transitory computer-readable storage medium is provided in which is stored one or more programs including executable instructions capable of being read and executed by an electronic device (including but not limited to a computer, a server, or a network device, etc.) to implement any of the above man-machine dialogue mode switching methods in the present disclosure.

In some embodiments, a computer program product is also provided, including a computer program stored on a non-volatile computer-readable storage medium. The computer program includes program instructions, which, when being executed by a computer, cause the computer to perform any of the above man-machine dialogue mode switching methods in the present disclosure.

In some embodiments, an electronic device is also provided, including: at least one processor, and a memory communicatively coupled to the at least one processor. The memory stores instructions executable by the at least one processor, which, when being executed by the at least one processor, cause the at least one processor to perform the man-machine dialogue mode switching method in the present disclosure.

In some embodiments, a storage medium is also provided, in which a computer program is stored, characterized in that the program, when being executed by a processor, performs the man-machine dialogue mode switching method in the present disclosure.

The above man-machine dialogue mode switching system according to the embodiment of the present disclosure may be adopted to perform the man-machine dialogue mode switching method according to the embodiments of the present disclosure, and correspondingly achieve the technical effect achieved by the man-machine dialogue mode switching method according to the above embodiments, which will not be repeated here. In the embodiments of the present disclosure, relevant functional modules may be implemented by a hardware processor.

Figure 5:
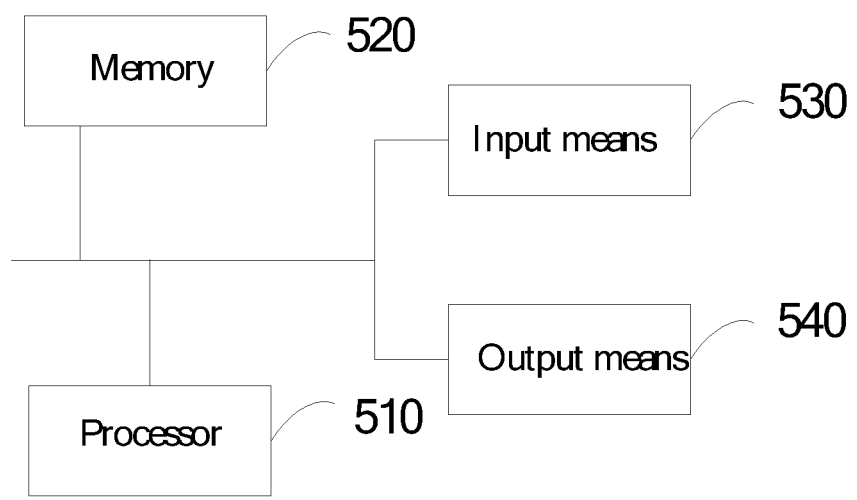
FIG. 5 is a schematic structural diagram of an electronic device according to an embodiment of the present disclosure.

FIG. 5 is a schematic diagram of a hardware structure of an electronic device for performing a man-machine dialogue mode switching method according to another embodiment of the present disclosure. As shown in FIG. 5, the device includes:

one or more processors 510 and a memory 520, in which one processor 510 is taken as an example in FIG. 5.

The device for performing the man-machine dialogue mode switching method may further include an input means 530 and an output means 540.

The processor 510, the memory 520, the input means 530, and the output means 540 may be connected by a bus or in other ways, and the connection by a bus is taken as an example in FIG. 5.

As a non-volatile computer-readable storage medium, the memory 520 may store non-volatile software programs, non-volatile computer-executable programs and modules, such as program instructions/modules corresponding to the man-machine dialogue mode switching method in the embodiment of the present disclosure. The processor 510 executes various functional applications and data processing of a server by running the non-volatile software programs, instructions and modules stored in the memory 520, that is, to implement the man-machine dialogue mode switching method according to the above method embodiment.

The memory 520 may include a stored program area and a stored data area. The stored program area may store the operating system and an application program required by at least one function. The stored data area may store data created according to the use of the man-machine dialogue mode switching device, and the like. Additionally, the memory 520 may include a high-speed random access memory, and may also include a non-volatile memory, such as at least one magnetic disk storage device, a flash memory device, or other non-volatile solid-state storage device. In some embodiments, the memory 520 may optionally include memories located remotely relative to the processor 510, and these remote memories may be connected to the man-machine dialogue mode switching device through a network. Examples of such networks include, but are not limited to, the Internet, an intranet, a local area network, a mobile communication network, and combinations thereof.

The input means 530 may receive input numerical or character information, and generate signals related to user settings and function control of the man-machine dialogue mode switching device. The output means 540 may include a display device such as a display screen.

One or more modules are stored in the memory 520, and when being executed by one or more processors 510, perform the man-machine dialogue mode switching method in any of the above method embodiments.

The above product may perform the method according to the embodiments of the present disclosure, and has corresponding functional modules and beneficial effects for performing the method. For technical details not described in detail in this embodiment, reference may be made to the method according to this embodiment of the present disclosure.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

It should be understood by those of ordinary skill in the art that the above embodiments are only for illustrating the technical solution of the present application instead of applying any restriction thereon. Although detailed description has been made for the present application by referring to the above embodiments, the skilled in the art can appreciate that the technical solutions of the above embodiments may be modified, or some technical features thereof may be equivalently replaced. These modifications or substitutions do not make the essence of the corresponding technical solutions depart from the spirit and scope of the technical solutions of the embodiments of the present disclosure.

What is claimed is:

1. A man-machine dialogue mode switching method, applied to an electronic device, comprising:
    receiving a current user sentence spoken by a current user;
    determining whether a dialogue field to which the current user sentence belongs is a preset dialogue field, and
    if yes, switching a current dialogue mode to a full-duplex dialogue mode; or
    if not, switching the current dialogue mode to a half-duplex dialogue mode.

2. The method according to claim 1, wherein, when in the full-duplex dialogue mode, the method further comprises:
    in the process of multi-round dialogue, determining a dialogue field to which a received new user sentence belongs; and
    if the new user sentence belongs to a dialogue field different from which a previous user sentence in the process of multi-round dialogue belongs to, keeping a reply content corresponding to that of the previous user sentence.

3. The method according to claim 2, further comprising:
    if the new user sentence is received again, saving the reply content corresponding to the previous user sentence;
    acquiring a reply content corresponding to the new dialogue sentence and presenting the same to the user; and
    upon receiving a user voice instruction to re-acquire the reply content to the previous user sentence, acquiring the stored reply content of the previous user sentence and presenting the same to the user.

4. The method according to claim 1, wherein said determining whether the dialogue field to which the current user sentence belongs is the preset dialogue field comprises:
    determining the dialogue field to which the current user sentence belongs;
    acquiring user characteristic information of the current user based on the current user sentence;
    querying the preset dialogue field corresponding to the current user based on the user characteristic information; and
    determining whether the dialogue field belongs to the preset dialogue field.

5. The method according to claim 1, wherein the preset dialogue field is a dialogue field whose number of times of use by the current user exceeds a set threshold; and
    the method further comprises:
    determining whether the number of times the dialogue field to which the current user sentence belongs is mentioned by the current user exceeds the set threshold; and
    if yes, marking the dialogue field to which the current user voice belongs as the preset dialogue field corresponding to the current user.

6. An electronic device comprising at least one processor and a memory communicatively coupled to the at least one processor, wherein the memory stores instructions executable by the at least one processor, and the instructions, when being executed by the at least one processor, causes the at least one processor to:
    receive a current user sentence spoken by a current user;
    determine whether a dialogue field to which the current user sentence belongs is a preset dialogue field; and
    if yes, switch a current dialogue mode to a full-duplex dialogue mode; and
    if not, switch the current dialogue mode to a half-duplex dialogue mode.

7. The electronic device according to claim 6, wherein the at least (Original) one processor is further configured to, when in the full-duplex dialogue mode,
    determine, in the process of multi-round dialogue, a dialogue field to which a received new user sentence belongs; and
    if the new user sentence belongs to a dialogue field different from which a previous user sentence in the process of multi-round dialogue belongs to, keep a reply content corresponding to that of the previous user sentence.

8. The electronic device according to claim 7, wherein the at least one processor is further configured to,
    save the reply content corresponding to the previous user sentence if the new user sentence is received again;
    acquire a reply content corresponding to the new dialogue sentence and presenting the same to the user; and
    upon receiving a user voice instruction to re-acquire the reply content to the previous user sentence, acquire the stored reply content of the previous user sentence and presenting the same to the user.

9. The electronic device according to claim 6, wherein said determine whether the dialogue field to which the current user sentence belongs is the preset dialogue field comprises:
    determining the dialogue field to which the current user sentence belongs;
    acquiring user characteristic information of the current user based on the current user sentence;
    querying the preset dialogue field corresponding to the current user based on the user characteristic information; and
    determining whether the dialogue field belongs to the preset dialogue field.

10. The electronic device according to claim 6, wherein the preset dialogue field is a dialogue field whose number of times of use by the current user exceeds a set threshold; and
    the at least one processor is further configured to
    determine whether the number of times the dialogue field to which the current user sentence belongs is mentioned by the current user exceeds the set threshold; and if yes, mark the dialogue field to which the current user voice belongs as the preset dialogue field corresponding to the current user.

\* \* \* \* \*